(12) United States Patent
Thompson et al.

(10) Patent No.: US 11,760,691 B2
(45) Date of Patent: Sep. 19, 2023

(54) HIGH FRICTION SURFACE TREATMENT METHOD AND SYSTEM THEREOF

(71) Applicant: Kraton Polymers LLC, Houston, TX (US)

(72) Inventors: Martin Thompson, Jacksonville, FL (US); David Broere, Almere (NL); Adam Fasula, Jacksonville, FL (US)

(73) Assignee: KRATON CORPORATION, Houston, TX (US)

( * ) Notice: Subject to any disclaimer, the term of this patent is extended or adjusted under 35 U.S.C. 154(b) by 570 days.

(21) Appl. No.: 16/949,064

(22) Filed: Oct. 12, 2020

(65) Prior Publication Data

US 2021/0024417 A1    Jan. 28, 2021

Related U.S. Application Data

(63) Continuation-in-part of application No. 15/999,166, filed on Aug. 16, 2018, now Pat. No. 10,801,168.

(60) Provisional application No. 62/926,825, filed on Oct. 28, 2019, provisional application No. 62/546,507, filed on Aug. 16, 2017.

(51) Int. Cl.
| | | |
|---|---|---|
| *C04B 26/22* | (2006.01) | |
| *C04B 26/04* | (2006.01) | |
| *C08K 3/013* | (2018.01) | |
| *C08K 5/00* | (2006.01) | |
| *C04B 111/00* | (2006.01) | |

(52) U.S. Cl.
CPC .............. *C04B 26/22* (2013.01); *C04B 26/04* (2013.01); *C08K 3/013* (2018.01); *C08K 5/0016* (2013.01); *C04B 2111/0075* (2013.01); *C04B 2111/00362* (2013.01)

(58) Field of Classification Search
CPC ................... C04B 26/04; C04B 26/22; C04B 2111/00362; C04B 2111/0075; C08K 3/013; C08K 5/0016
See application file for complete search history.

(56) References Cited

U.S. PATENT DOCUMENTS

| | | |
|---|---|---|
| 4,578,429 A | 3/1986 | Gergen et al. |
| 7,858,693 B2 | 12/2010 | Wright |
| 8,702,343 B1 * | 4/2014 | Vitale ....................... E01C 3/04 404/19 |

* cited by examiner

*Primary Examiner* — Edward J Cain
(74) *Attorney, Agent, or Firm* — Beth Haslam

(57) ABSTRACT

A method for applying a high friction surface roadway treatment and composition used therein is disclosed. The method comprises the steps of: providing a binder composition, comprising: 10-99.9 wt. % of a resin; 0.1-70 wt. % of an elastomer; heating the binder composition to a sufficient temperature to obtain a molten binder composition; applying a layer of the molten binder composition; and applying a layer comprising aggregate having a nominal maximum size of at least 1 mm, and an embedment depth of at least 30% in the molten binder composition layer. The resin is selected from hydrocarbon resins, alkyd resins, rosin resins, rosin esters, and combinations thereof.

20 Claims, 2 Drawing Sheets

HIGH FRICTION SURFACE TREATMENT METHOD AND SYSTEM THEREOF

RELATED APPLICATIONS

This application claims the benefit of U.S. Provisional Application No. 62/926,825, filed Oct. 28, 2019, and this application is a continuation-in-part of U.S. patent application Ser. No. 15/999,166, filed on Aug. 16, 2018, the entire disclosures of which are incorporated herein by reference.

FIELD

This disclosure relates to a method for applying a high friction surface treatment onto a roadway and compositions used therein.

BACKGROUND

In the construction industry, various surface treatments are applied to impart desired characteristics to a roadway. For example, surface treatments (e.g., friction-modifying coatings) can be applied to roadway surfaces to increase the coefficient of friction of the roadway, reducing the possibility of slippage or skidding on the roadway.

High-friction surface treatments ("HFST") typically include polymer resin (e.g., epoxy resin) and aggregate materials that are separately applied in a stepwise process. The polymer resins act as a binder to hold the aggregate to the roadway, providing an anti-skid surface. Conventional HFST can also include polymers, rosin esters, and aggregate materials that are mixed together at elevated temperatures then poured into a shoe box applicator and manually applied to roadway surfaces.

The conventional application of the binder (e.g., epoxy, polymer or resin) and aggregate is manual, with typical drawbacks including relatively longer curing times, inadequate mixing of the components, imprecise measuring techniques resulting in an incorrect ratio of binder to aggregate, and uneven application. As such, the conventional systems for applying surface treatments can be time-consuming and inefficient.

There is a need for improved systems and methods for addressing one or more of the above-described limitations.

SUMMARY OF THE INVENTION

A method for treating a roadway with a high friction surface, the method comprising the steps of providing a binder composition, comprising: 10-99.9 wt. % of a resin, wherein the resin is selected from hydrocarbon resins, alkyd resins, rosin resins, rosin esters, and combinations thereof and 0.1-70 wt. % of an elastomer. Heating the binder composition to a sufficient temperature to obtain a molten binder composition, applying a layer of the molten binder composition on the roadway for a thickness of at least 40 mils; and then applying a layer comprising aggregates on top of the molten binder composition, wherein the aggregates have a nominal maximum size of at least 1 mm. The layer comprising aggregates is applied on top of the molten binder composition layer within 60 seconds, for the aggregates to be embedded to a depth of at least 30% in the molten binder composition layer.

A composition for spreading on a roadway, according to the method described above, wherein the composition comprises: 10-96 wt. % of a resin, wherein the resin is selected from hydrocarbon resins, alkyd resins, rosin resins, rosin esters, and combinations thereof, 0.1-30 wt. % of an elastomer, and aggregates, wherein the aggregates have a nominal maximum size of at least 1 mm. The composition also comprises at least a component selected from: up to 15 wt. % plasticizer, up to 10 wt. % pigment, up to 15 wt. % wax, up to 60 wt. % filler.

DESCRIPTION

Figure 1:
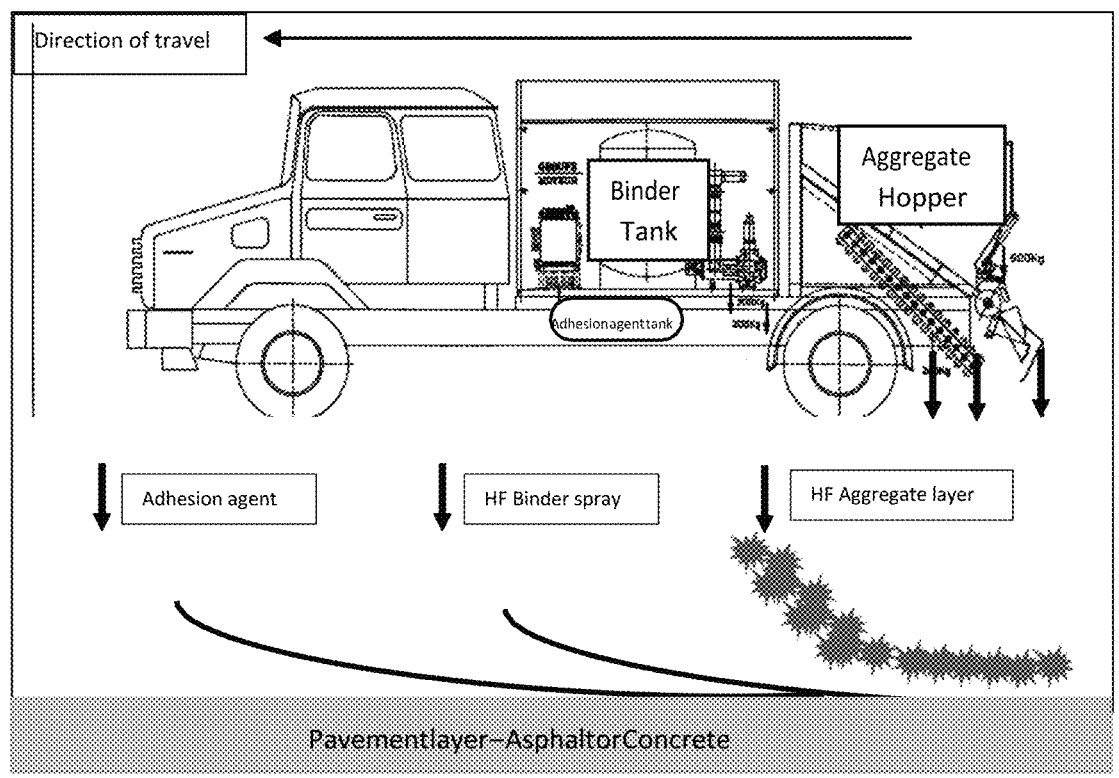
FIG. 1 is a schematic diagram showing a system for applying a high friction surface roadway treatment.
Figure 2:
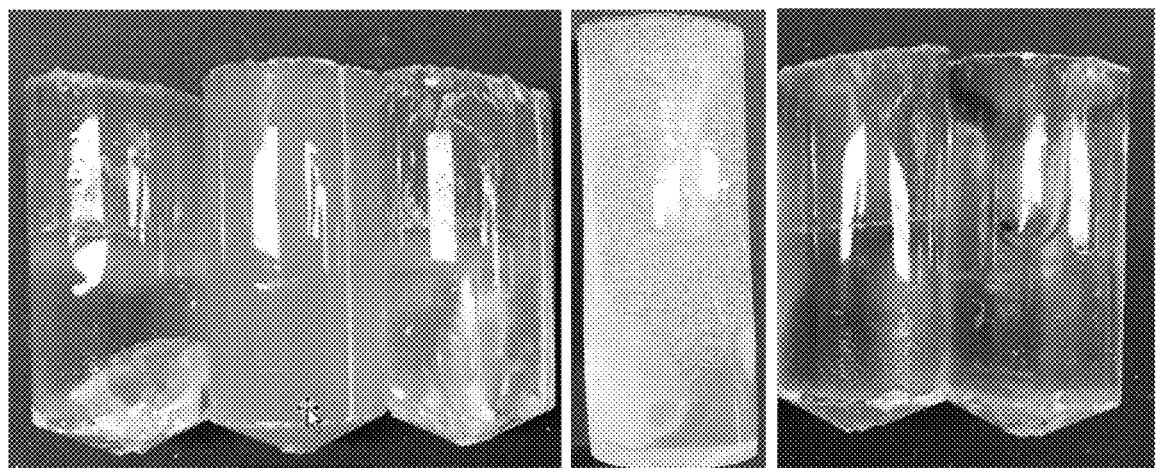
FIG. 2 is a photograph illustrating phase separation characteristics of various binder compositions.

The following terms will be used throughout the specification.

"Thermoplastic" means a polymeric or wax material that has the property of softening or melting, and becoming pliable when heated and of hardening and becoming rigid again when cooled.

"Roadway" refers to a surface including aircraft runways and taxiways, roadways, walkways, bicycle paths, curbs, traffic barriers, barricades, steps, parking lots, metallic surfaces, oil rig decks, roofs, warehouse floors, and transportation-related horizontal, inclined or vertical surfaces. The surface can be concrete, asphalt, cement, or tile based. "Roadway" may be used interchangeably with "pavement," or "road."

"High friction surface" as used herein is an additionally placed surface on roadways, for use as a treatment to restore and maintain roadway friction. The material used for high friction surface treatment is a thin overlay of high quality polish-resistant aggregate bonded to the roadway surface with a resinous binder. "High friction surface" may be used interchangeably with "high friction surface treatment," or "high friction surface roadway treatment," or "high friction surface treatment system," or "HFST."

"Road marking" is used interchangeably with "pavement marking," means the application of a marking composition to a pavement.

"Nominal maximum size" is measured using ASTM D448-12(2017).

"Binder composition," or "binder material," or "binder mixture," or "binder" comprises at least a tackifier resin and an elastomer.

"Pelletized binder," or "pelletized material," or "pellet binder system," or "binder system," refers to the pelletized binder composition with without additional components.

"Miscible" or "miscibility" means the blending of two materials, e.g., two different resins, or a resin and a polymer, and the materials are miscible at the specific fractions if a single glass transition temperature ($T_g$) is obtained via Differential Scanning calorimetry (DSC) measurements. If two different glass transition temperatures are obtained, then the materials are immiscible.

"Mono alkenyl arene," "vinyl aromatic," and "styrene" may be used interchangeably.

"Molecular weight" or MW refers to the styrene equivalent molecular weight in kg/mol of a polymer block or a block copolymer. MW can be measured with gel permeation chromatography (GPC) using polystyrene calibration standards, such as is done according to ASTM 5296-19. The GPC detector can be an ultraviolet or refractive index detector or a combination thereof. The chromatograph is calibrated using commercially available polystyrene molecular weight standards. MW of polymers measured using GPC so calibrated are styrene equivalent molecular weights or apparent molecular weights. MW expressed herein is measured at the peak of the GPC trace and are commonly referred to as styrene equivalent "peak molecular weights," or denoted as MWp.

"Diblock content" and "styrene/rubber weight ratio" are provided as related to SBC polymer fraction.

"Random distribution" means that the distribution of monomers from one end of the block to the other end is roughly uniform (e.g., it is a statistical distribution based on the relative concentrations of the monomers).

"Blocked distribution" means that the distribution is a nonuniform distribution in which the A monomers (or in the alternative the B monomers) are more likely to be grouped with other A monomers (or in the case of the B monomers, with other B monomers) than is found in a statistical (i.e., "random") distribution thereby resulting in a short "defined" monomer block.

"Tapered distribution" means that the distribution is a nonuniform distribution in which the concentration of A monomer (or in the alternative, B monomer) at one end of the block is greater than at the other end of the block (it gradually declines from one end of the block to the other end of the block).

"Controlled distribution" means that the molecular structure of the controlled distribution block copolymer has the following attributes: (1) terminal regions adjacent to the mono alkenyl arene homopolymer ("A") blocks that are rich in (i.e., having a greater than average amount of) conjugated diene units; (2) one or more regions not adjacent to the A blocks that are rich in (i.e., having a greater than average amount of) mono alkenyl arene units; and (3) an overall structure having relatively low mono alkenyl arene, e.g., styrene, blockiness.

"Rich in" is defined as greater than the average amount, preferably 5% greater than the average amount.

"$T_{sp}$" (softening point) is determined by ASTM E28, ASTM 218, ring and ball, or ring and cup softening point tests.

The binder composition comprises a tackifier resin component, an elastomer, optional plasticizers, optional waxes, optional pigments, and optional fillers, for use in HFST applications. The composition can be applied directly onto a roadway surface as HFST layer, or a layer on top of an optional adhesion agent. Aggregates are then applied onto the binder layer to produce a high friction surface on the roadway.

Tackifier Resin Component: The tackifier resin can be based on hydrocarbon resins, alkyd resins, rosin resins, rosin esters, and combinations thereof.

Materials produced using hydrocarbon based resins are typically used in long-line or longitudinal applications, whereas alkyd formulations can be used in any application. Alkyd based thermoplastic binders typically comprise of one or more member selected from the group consisting of rosin resins, rosin esters and derivatives.

In one embodiment, the tackifier resin comprises rosin resins selected from the group of modified rosin resins and rosin esters. Modified rosin resins comprise one or more component selected from the group of rosin acids, maleic anhydride, fumaric acid or maleic modified rosin esters (MMRE). Rosin acids, derived from trees as gum rosin, wood rosin, or tall oil rosin, are comprised of one or more component of the group consisting of abietic acid, neoabietic acid, dehydroabietic acid, levopimaric acid, pimaric acid, palustric acid, isopimaric acid, and sandaracopimaric acid. Rosin esters are comprised of one or more derivative obtained from the reaction of one or more rosin acids and one or more alcohol from the group of alcohols consisting of methanol, triethylene glycol, glycerol, and pentaerythritol. In one embodiment, the rosin ester has a softening point of between 80° C. and 150° C.

In embodiments, modified rosin resins include rosin resins modified with one or more components selected from the group of acid anhydrides, e.g., maleic anhydride; and polycarboxylic acids, such as maleic acid and fumaric acid. In another embodiment, the modified rosin resin is selected from maleated rosin, fumarated rosin, acrylated rosin, amidated rosin, nitrated rosin, chlorinated rosin, brominated rosin, and mixtures thereof. In an embodiment, the rosin ester can comprise the reaction product of one or more rosin acids and one or more alcohols selected from the group consisting of methanol, triethylene glycol, glycerol, and pentaerythritol.

In some embodiments, the tackifier resin comprises rosin ester resins selected from hydrogenated hydrocarbon rosin esters, acrylic rosin esters, disproportionation rosin esters, dibasic acid modified rosin esters, polymerized resin esters, phenolic modified rosin ester resins, and mixtures thereof. In other embodiments, the binder comprises a mixture of maleic modified glycerol ester and pentaerythritol ester of rosin resins.

Alkyd resins are polyesters modified by the addition of fatty acids and other components. In an embodiment, the alkyd resin is selected from the group of rosin resins, rosin esters, derivatives of rosin esters and rosin esters, and combinations thereof. In some embodiments, the rosin ester resins are selected from hydrogenated forms of rosin esters, acrylic rosin esters, disproportionated rosin esters, fortified rosin esters obtained by Diels-Alder reaction of a rosin acid having conjugated double bonds with a dienophile, dibasic acid-modified rosin esters, polymerized rosin esters, phenolic-modified rosin esters, and mixtures thereof. In embodiments, the rosin resin is a rosin ester having a softening point between 95° C. and 120° C.

In embodiments, the tackifier resin comprises one or more esters derived from one or more acid anhydrides, or polycarboxylic acid, e.g., a di- or a tricarboxylic acid, with one or more polyols. Examples of such a resin include a mixture of maleic-modified glycerol ester and pentaerythritol ester of rosin resins.

In embodiments, the tackifier resin is a hydrocarbon resin. Examples of hydrocarbon resins include resins selected from the group of C5 aliphatic hydrocarbon resins, C9 aromatic hydrocarbon resins, C5/C9 hydrocarbon blend, and saturated resins made from hydrogenation of these hydrocarbon resin. C5 aliphatic hydrocarbon resins are produced from distillation reactions in the presence of a Lewis catalyst, of piperylene which comprises one or more components of the group of trans-1,3-pentadiene, cis-1,3-pentadiene, 2-methyl-2-butene, dicyclopentadiene, cyclopentadiene, and cyclopentene. C9 aromatic hydrocarbon resins are a byproduct of naptha cracking of petroleum feedstocks used to produce C5 aliphatic resins, comprising one or more components of the group consisting of vinyltoluenes, dicyclopentadiene, indene, methylstyrene, styrene, and methylindenes. In embodiments, the hydrocarbon resins may be hydrogenated or unhydrogenated.

In embodiments, the tackifier resin is a polyamide is selected from the group of aliphatic polyamide, cycloaliphatic polyamide, partly aromatic polyamide, and a mixture thereof. In another embodiment, the polyamide is a resin based on dimer acid having a softening point of 120-130° C. and an elongation % of at least 275.

In one embodiment, some or all of the tackifier resin is of the type that is immiscible in the elastomer component to minimize the remassing of the blend product during shelf storage, e.g., in pellet form, so they remain free flowing when delivered to customers for use in making the binder composition used for high friction surface treatment. In embodiments, the immiscible resin is present in 25-100% of the total amount of tackifier resin. In embodiments, the immiscible resin is moderately or highly modified, so when the elastomer is blended into the immiscible or insoluble continuous phase of the tackifier resin, the elastomer will ball up as a tight coil, preventing or minimizing the remassing. Examples of immiscible resins include but are not limited to maleated rosin ester, fumarated rosin ester, acrylated rosin ester, amdidated rosin ester (amine modified), nitrated rosin ester, chlorinated rosin ester, brominated rosin ester, and mixtures thereof. In one embodiment, the immiscible resins are selected from maleated rosin, fumarated rosin, and acrylated rosin.

In embodiments when used in a binder material, the tackifier resin component is present in an amount ranging from 10 to 99.9 wt. %, or 60 to 99 wt. %, or at least 70 wt. % of the binder material.

In embodiments as a component of surface treatment composition, the tackifier resin is present in an amount ranging from 20 to 96 wt. %, or 20 to 90 wt. %, or 30 to 90 wt. %, or 40 to 90 wt. % of the surface treatment composition as applied onto the pavement.

Elastomer Component: The binder composition includes at least an elastomer. Examples of elastomers include, but are not limited to natural rubber (NR), isoprene rubber (IR), styrene-butadiene rubber (SBR), chloroprene rubber (CR), butadiene rubber (BR), nitrile butadiene rubber (NBR), isobutylene-isoprene rubber (IIR), ethylene-propylene diene monomer (EPDM), urethane rubber (UR), silicone rubber (SR), fluorocarbon rubber (FR), styrene-isoprene-styrene rubber (SIS), styrene-butadiene-styrene rubber (SBS), styrene-ethylene/butylene-styrene (SEBS), styrene-ethylene/butylene/styrene-styrene (SEBSS), styrene-ethylene/propylene-styrene (SEPS), ethyl vinyl acetate (EVA), graft copolymers of EVA with another monomer such as vinyl chloride, a hot-melt polyamide resin, and mixtures thereof. These polymers disperse readily with the resin and other components at temperatures of 180° C. to 220° C., where the polymer and/or the resin become molten.

In one embodiment, the elastomer is selected from the group of styrene-isoprene-styrene (SIS) block copolymers with a styrene/rubber ratio of at least 15:85 and elongation at break % of at least 1000. In another embodiment, the elastomer is selected from styrene butadiene styrene (SBS) polymers with a styrene/rubber ratio of at least 20:80, and elongation at break % of at least 600. In an embodiment, the elastomer is selected from styrene-isoprene-styrene rubber (SIS), styrene-butadiene-styrene rubber (SBS), styrene-ethylene/butylene-styrene (SEBS), and SEBS rubber having 1 to 3 wt. % maleic anhydride (MA) grafted onto the rubber midblock.

In yet another embodiment, the elastomer is a styrene-ethylene/butylene-styrene (SEBS) or styrene-ethylene/propylene-styrene (SEPS) block copolymer, e.g., KRATON G-series polymers from Kraton Corp., with a styrene/rubber weight ratio ranging from 10:90 to 35:65, elongation at break (%) of at least 200 and preferably at least 500, and a Brookfield Viscosity, mPa·s (or cP) (25% wt. neat polymer concentration in toluene at 25° C.) in the range of 1500-10000. In another embodiment, the elastomer is a SEBS polymer with a styrene/rubber weight ratio of at least 30:70.

In embodiments, the elastomer is a functionalized rubber, e.g., SEBS polymer with maleic anhydride (MA) grafted onto the rubber midblock, e.g., having 1 to 3 wt. % maleic anhydride. The MA grafting improves the adhesion of the binder to other components in a high friction surface treatment composition. Examples of grafted elastomers are described in U.S. Pat. No. 4,578,429 which is incorporated by herein by reference.

In embodiments, the elastomer is a block copolymer having at least two A blocks and at least one B block with a general formula configuration of A-B-A, (A-B)nX, (A-B-A)nX (A1-B)$_d$X-$_e$(B-A2). X is the residue of a coupling agent and n is from 2 to 30, d is 1 to 30, and e is 1 to 30.

Each A, A1, or A2 block is independently selected from mono alkenyl arene polymer blocks. Each B, block is independently selected from (1) polymer blocks having at least one conjugated diene and at least one mono alkenyl arene and having a random distribution; (2) polymer blocks having at least one conjugated diene and at least one mono alkenyl arene and having a blocked distribution; (3) polymer blocks having at least one conjugated diene and at least one mono alkenyl arene and having a tapered distribution; and (4) polymer blocks having at least one conjugated diene and at least one mono alkenyl arene and having a controlled distribution.

Further, the mono alkenyl arenes utilized in the A and B blocks of the block copolymers are independently selected from styrene, alpha-methylstyrene, para-methylstyrene, vinyl toluene, vinylnaphthalene, and para-butyl styrene or mixtures thereof.

The conjugated dienes of the B blocks are independently selected from 1,3-butadiene and substituted butadienes. In embodiments, B is selected from isoprene, piperylene, 2,3-dimethyl-1,3-butadiene, and 1-phenyl-1,3-butadiene, or mixtures thereof.

Each block B is partially or fully hydrogenated. Each block A is either unhydrogenated, partially hydrogenated or fully hydrogenated.

In embodiments, each A block has a peak number average molecular weight between about 3,000 and about 60,000 or from 5,000 to 45,000. In embodiments, the molecular weight of A1 and A2 blocks differ by at least 20%.

In embodiments, the weight percent of mono alkenyl arene in each B block is between about 5 wt. % and about 75 wt. %. In embodiments, the B block has a vinyl content between 20 and 80 mol %.

In embodiments, each B block has a peak number average molecular weight (MW1) between about 20,000 and about 300,000, or between 20,000 to 200,000 or between 20,000 to 150,000.

In embodiments, the elastomer component furthers comprises a tailored softening modifier which is structurally related to the character of the B block of said block copolymer, as disclosed in U.S. Pat. No. 7,858,693 incorporated herein by reference in its entirety. The ratio (MW2)/(MW1) of the peak number average molecular weight of said softening modifier (MW2) to the peak number average molecular weight of said B block of said block copolymer (MW1) is 0.01 to 1.0, with a minimum molecular weight (MW2) of 2,000. The weight percent of mono alkenyl arene (S1) in each softening modifier (S2) is between about 5 percent and about 75 percent and the ratio of S2/S1 is between 0.5 and 1.5.

In embodiments, the elastomer component is a styrene-isoprene-styrene (SIS). The SIS has a molecular weight ranging from 10,000 to 20,000, or 10,000 to 16,000 and a molecular weight of 80,000 to 145,000. The diblock content in the SIS ranges from >1 wt. % to 60 wt. %. The total amount of mono alkenyl arene in the SIS is greater than 30 wt. %, or greater than 40% by wt. %, or greater than 43% by wt. %, or 30-80 wt. %, or 40-80 wt. %.

In embodiments, the elastomer is a block copolymer having a molecular weight in the range of from 20,000 to 500,000.

In embodiments, the elastomer has a Young's modulus of less than 2,800 psi (20 MPa) and a rubber modulus or slope between 100 and 300% elongation of greater than 70 psi (0.5 MPa).

In embodiments, the elastomer component has a particle size of greater than 500 µm, or >1000 µm, or >1500 µm, or >2,000 µm, or >2500 µm, or 0.5 to 15 mm, or 1 to 15 mm, or 1.5 to 15 mm, or 2 to 15 mm, or 2.5 to 15 mm.

In embodiments when used in a binder material, the elastomer component is present in an amount ranging from 1 to 70 wt. %, or to 65 wt. %, or 5 to 60 wt. %, or 5 to 55 wt. %, or 5 to 50 wt. %, or 5 to 40% wt. %, 5 to 35 wt. %, or 10 to 20 wt. % of the binder material.

In embodiments as a component of surface treatment applications, the elastomer is present in an amount ranging from 0.1-30 wt. %, or 1-20 wt. %, or at least 2 wt. % of the surface treatment composition as applied onto the pavement.

Optional Plasticizer Component: In some embodiments, the binder material and/or surface treatment can comprise at least one plasticizer selected from the group of vegetable oils, process oils, mineral oils, phthalates and mixtures.

Process oils are comprised of one or more components of the group consisting of paraffinic oils, naphthenic oils, and aromatic oils. Paraffinic oils are saturated carbon backbones, naphthenic oils have polyunsaturated carbon structure with little aromatic content, and aromatic oils have cyclic carbon unsaturation resulting aromatic classification. Phthalates are comprised of one or more components from the group consisting of dimethyl phthalate, diethyl phthalate, diallyl phthalate, di-n-propyl phthalate, di-n-butyl phthalate, diisobutyl phthalate, butyl cyclohexyl phthalate, di-n-pentyl phthalate, dicyclohexyl phthalate, butyl benzyl phthalate, di-n-hexyl phthalate, diisohexyl phthalate, diisoheptyl phthalate, butyl decyl phthalate, butyl(2-ethylhexyl) phthalate, di(n-octyl) phthalate, diisooctyl phthalate, n-octyl n-decyl phthalate, diisononly phthalate, di(2-prpoylheptyl) phthalate, diisodecyl phthalate, diundecyl phthalate, diisoundecyl phthalate, ditridecyl phthalate, and diisotridecyl phthalate.

Vegetable oils, also called triglycerides because they are the resultant reaction of fatty acids with glycerol, and synthetic alkyd oils are made of fatty acid esters of varying compositions, can be used. The fatty acids comprise one or more components, including ricinoleic acid, oleic acid, linoleic acid, linolenic acid, stearic acid, palmitic acid, dihydroxy stearic acid, myristic acid, myristoleic acid, palmitoleic acid, sapeinic acid, elaidic acid, vaccenic acid, alpha-linolenic acid, arachidonic acid, eicosapentaenoic acid, erucic acid, docosahexaenoic acid, caprylic acid, capric acid, lauric acid, arachidic acid, behenic acid, lignoceric acid, and cerotic acid.

In embodiments when used in a binder material for example, the optional plasticizer component can be present in an amount ranging from 1 to 20 wt. %, or at least 2 wt. % of the binder material.

In embodiments as a component of surface treatment applications, the optional plasticizer component can be present in an amount ranging up to 15 wt. %, or from 0.1 to 15 wt. %, or 1 to 10 wt. %, or 1 to 9 wt. %, or 2 to 8 wt. %, or up to 10 wt. % of the surface treatment composition as applied onto the pavement.

Optional Waxes: Waxes can be added to the dry mixes comprising the pelletized binder materials at the application site, for a surface treatment mixture for application to the road surface. In other embodiments, the waxes are added to the blend of elastomer and tackifier resin, forming the binder material.

The waxes can be any of vegetable waxes, petroleum derived waxes, and synthetic waxes. Vegetable waxes used in thermoplastics are normally naturally occurring mixtures of long-chain aliphatic hydrocarbons, containing esters of fatty acids and alcohols. The fatty acids are comprised of one or more component of the group consisting of ricinoleic acid, oleic acid, linoleic acid, linolenic acid, stearic acid, palmitic acid, dihydroxy stearic acid, myristic acid, myristoleic acid, palmitoleic acid, sapeinic acid, elaidic acid, vaccenic acid, alpha-linolenic acid, arachidonic acid, eicosapentaenoic acid, erucic acid, docosahexaenoic acid, caprylic acid, capric acid, lauric acid, arachidic acid, behenic acid, lignoceric acid, and cerotic acid. The alcohols are comprised of one or more members selected from the group consisting of glycerol, ethanol, methanol, pentaerythritol, iso-propanol, isopropyl alcohol, butanol, dihydroxy butanol, or any other mono-functional or multi-functional alcohol a varying long-chain aliphatic hydrocarbon backbone.

Petroleum derived waxes are comprised of one or more members selected from the group consisting of saturated n-alkanes, iso-alkanes, napthenes, alkyl-substituted aromatic compounds, and napthene-substituted aromatic compounds. Synthetic waxes can be polyethylene, Fischer-Tropsch waxes, chemically modified waxes, or amide modified waxes. Polyethylene waxes generally have the chemical formula $(C_2H_4)_nH_2$ and are comprised, based on branching and chemical structure, of one or more component of the group consisting of ultra-high-molecular-weight polyethylene (UHMWPE), high-density polyethylene (HDPE), cross-linked polyethylene (PEX or XLPE), medium-density polyethylene (MDPE), linear low-density polyethylene (LLDPE), low-density polyethylene (LDPE), very-low-density polyethylene (VLDPE), and copolymers. Fischer-Tropsch waxes generally have the chemical formula $(C_nH_{(2n+2)})$.

Synthetic waxes can be polyethylene, Fischer-Tropsch waxes, chemically modified waxes, or amide modified waxes.

Chemically modified waxes are converted from non-polar to polar molecules by the incorporation of a functional chemical group comprising one or more component consisting of a hydroxyl group, a carboxyl group, a salt, an ester group, and an acid group. Amide modified waxes are chemically modified waxes that have amide functional molecules grafted to the polyethylene molecule to modify flexibility, adhesion, or system compatibility of the wax.

In embodiments when used in a binder material for example, the optional wax can be present in an amount ranging up to 20 wt. %, or from 1 to 20 wt. %, or at least 2 wt. %, or less than 10 wt. %, or less than 5 wt. % of the binder material.

In embodiments as a component of surface treatment applications, the optional wax can be present in an amount ranging up to 10 wt. %, or from 1 to 10 wt. %, or 1 to 9 wt. %, or 2 to 8 wt. %, or less than 5 wt. % of the surface treatment composition as applied onto the pavement.

Optional Pigments: Pigments can be optionally included in the binder composition. The pigment can be added to the binder composition at the application site, or into blend of the tackifier resin and elastomer, and then extruded forming pelletized binder materials. The pigments can comprise one or more different colored materials. The pigment for white materials is predominately Type II rutile titanium dioxide. The pigment for yellow materials is an organic based yellow pigment which can be a combination of yellow and red or orange pigments designed to withstand high temperatures and provide UV resistance and weatherability. The pigment can be Rutile Type II titanium dioxide with a minimum purity of 92% for white materials, and a combination of titanium dioxide and organic or other heavy metals free yellow pigments for yellow materials. The pigments can have different properties, such as high temperature stability, UV resistance, and weatherability.

In embodiments of binder material, pigments can be present in an amount up to 15 wt. %, or 1-10 wt. %, or 0.5-7 wt. %, or 1-5 wt. %, or less than 3 wt. % of the binder composition.

In embodiments as a component of surface treatment composition, the pigments can be present in an amount up to 10 wt. %, or 0.1-10 wt. %, or 0.5-7 wt. %, or 1-5 wt. %, or less than 3 wt. % of the surface treatment composition as applied onto the pavement.

Optional Fillers: Fillers are used to extend the thermoplastic resin, and confer some special properties. Fillers can be added at the production site to the pelletized binder material, or in some embodiments, some of the fillers can be optionally added to the tackifier resin and elastomer to form the binder material.

In embodiments, fillers are ground calcium carbonate of various particle size based on desired flow characteristics. In embodiments, fillers can include but are not limited to other fillers, catalysts, or performance-enhancing materials that may include catalysts, compatabilizers, ultra-violet stabilizers, thermal stabilizers, oxidative stabilizers, chemical stabilizers, wear resistance modifiers, reflectivity enhancers, water repellants, oil repellants, ice repellants, co-polymers, rubbers, including, ground up particles of discarded tire rubber, pigments, and/or the like, effective for changing the properties or performance of the high friction surface treatment system.

In embodiments, optional fillers present in the binder material, or a surface treatment composition containing the binder material can range up to 60 wt. %, or from 0.05 to 60 wt. %, or 0.1 to 50 wt. %, or 2 to 40 wt. %, or 5 to 30 wt. %, or 5 to 20 wt. %, or at least 0.1 wt %.

Properties of the Binder Composition: The binder material, a combination of elastomer and tackifier resin, can be used in compositions for applying to roadway surfaces. In embodiments, the binder composition is combined with other optional materials.

The binder compositions disclosed herein have desirable viscosity, gel time, strength, hardness, elongation, low water absorption, and adhesive strength. With respect to viscosity, the binder is spreadable without being too runny. In embodiments, the gel or the cure time for the binder compositions are relatively less than those of epoxy based systems, which can lead to faster HFST coverage of the roadway surface.

The use of a two-component binder composition (e.g., an elastomer and tackifier resin) or a three (e.g., elastomer, tackifier resin and plasticizer) or more component pelletized binder composition, in conjunction with other materials such as fillers, and other optional components, results in a reduction in preparation time (heating/melting/and extrusion) of at least 15% over an application with all the ingredients being added, heated, melted and mixed together as is.

In embodiments, the binder composition consisting essentially of elastomer and tackifier resin is characterized as having a phase separation (homogeneity) ratio in the range of 0.4 to 2, or 0.5 to 1.5, or 0.5 to 1, or 0.75 to 1, or greater 0.5 or less than 2 or less than 1.8, in a Phase Separation Test. Phase Separation Test refers to a test wherein a composition having an elastomer and a tackifier resin with a ratio of 15:85 wt. % respectively is tested for phase separation. In the test, an amount of 60 grams of elastomer and tackifier resin mixture is melted, poured into a 100 ml tube. The tube is 2 cm in diameter with a length of 10 cm. The sample is then aged for 6 hours at 200° C. After solidification, a 1 cm sample is sliced from the top and bottom which is analyzed by GPC using polystyrene standards to obtain the percentage of elastomer difference. The amount of phase separation is determined by comparing the percentage of polymer and resin in the top sample versus the polymer and resin in the bottom sample. The phase separation ratio is calculated by taking the amount of elastomer in the top sample and dividing by the percentage of elastomer in the bottom sample.

For example, the top sample shows 50% elastomer and 50% resin and the bottom shows 5% elastomer and 95% resin, there is phase separation with a phase separation ratio of 10 (5:50). If both the top and bottom samples show 15% elastomer and 85% resin, there is no phase separation with a phase separation ratio of 1 (15:15). In another example of 10% elastomer in the top sample and 20% elastomer in the bottom, there is minimal separation with a phase separation ratio of 0.5 (10:20).

The binder has sufficient strength and erosion resistance to withstand traffic conditions. The binder has satisfactory hardness to prevent shoving under traffic. In embodiments, the binder has a Shore D hardness of 50-90 according to ASTM D2240.

The binder compositions have adequate flexibility to resist cracking. The binder also has low moisture absorption, thus minimizing or eliminating water-related damage. In embodiments, the binder composition has an elongation at break point of 20-80%, according to ASTM D-638.

In embodiments, the binder composition when heated to 200° C. has a viscosity of at least 100 mPa·s, or of at least 250 mPa·s, or of at least 500 mPa·s, and has a $T_{sp}$ of at least 85° C., or >95° C., or >100° C., or >125° C., or >150° C., or 80° C. to 200° C. In embodiments, the binder composition comprising an elastomer and a tackifier resin has an acid number of less than 50, or <40, or <30, or <20. The gel time is such that there is adequate time to spray the binder and apply the aggregates on top of the roadway surface.

In embodiments, the binder has good adhesive strength to hold the aggregate in position. This can minimize the aggregate coming loose from the HFST composition, thereby improving functional life.

In an embodiment, less than 15 wt. %, or <10 wt. %, or <7 wt. %, or <5 wt. % of the aggregate debonds (become loose) from the binder over a period of one year.

Method for Making the Binder composition: In embodiments, the binder material components, e.g., elastomer and tackifier resin, are combined together then pelletized by a variety of methods. In embodiments, the components, e.g., tackfier resin, elastomer, optional plasticizers, optional waxes, optional pigments, and optional fillers are combined to form the binder. In embodiments, the binder composition can be made by combining the tackifier resin and the elastomer components with a plasticizer and a filler, or with a plasticizer and a wax, or with a plasticizer and a pigment, or with a wax and a pigment, or with a wax and a filler, or with a pigment and a filler, or with any single component selected from a plasticizer, a wax, a pigment, and a filler.

In one embodiment, the binder material contains all ingredients necessary to form the adhesive for use in a HFST, to which additional components such as pigments, plasticizers, fillers, waxes, etc., or pellets containing a different thermoplastic binder, may be optionally added as determined by local conditions of application.

In one embodiment, the "additional" components include a 2nd resin that is different from the 1st resin in the binder composition, with the 2nd resin being miscible or compatible with both the 1st resin and the elastomer polymer in the binder composition. The use of the binder composition including the 1st immiscible resin minimizes the amount of remassing of the pellets in storage and transport and also minimizes the melting and blending time required before application to the road, while the 2nd miscible resin allows the elastomer to change configuration as the binder composition is melted and blended to impart flexibility, with the resulting surface treatment to have excellent flexibility, toughness, and aggregate adhesion.

Miscible 2nd resins for blending with the binder composition (containing a 1st resin that is immiscible with the polymer in the pelletized binder) include but are not limited to rosin esters, which are miscible with both polymers such as styrene butadiene styrene (SBC) and maleic modified glycerol rosin esters (as 1st resin). Examples include pentaerythritol ester of hydrogenated rosin, glycerol esters), hydrocarbon esters such as piperlyene and isoprene, both hydrogenated and not hydrogenated, styreneated hydrocarbon resins, and terpene based resins such as terpene phenolic, styreneated terpene, and polyterpene resins. With the addition of the 2nd resin that is compatible with both the 1st resin and the polymer in the binder composition, the miscibility goes up allowing the polymer in the pelletized binder composition to "uncoil." thus enhancing the properties of the mix as intended, increasing the flexibility, toughness, and bead adhesion of the final surface treatment.

In embodiments, the individual components are combined, extruded and pelletized, forming homogeneous compositions in the form of pellets for convenient handling at the application site.

Pelletization can be achieved by a variety of methods depending on the types and characteristics of the components used in forming the pellets. Examples of pelletization methods include granulation or briquetting, mixing agglomeration, and extrusion agglomeration to form pellets of a substantially homogeneous binder. In one embodiment, after the pellets are formed, they are coated with an adhesion inhibiting agent to remove/reduce clumping during storage and transit. Examples of adhesion inhibiting agents include but are not limited to talc, chalk, and silica.

In one embodiment, the molten components are first mixed together in a reactor to form a mixture, then fed into an extruder forming strands, which are subsequently cut into pellets or are fed onto a pelletizing belt through pumping the hot liquid into a cylindrical stator whereby the liquid is pushed through a perforated shell onto the cooling belt. In one embodiment, after the pellets are formed, they are coated with an adhesion inhibiting agent to remove/reduce clumping during storage and transit. Examples of adhesion inhibiting agents include but are not limited to talc, chalk, and silica.

The pellets can differ in size depending the components used in the binder composition. In one embodiment, the pellets are of the size that is not too large, e.g., less than 50 $cm^3$. In another embodiment, at least 75% of the pellets are formed to have a volume of less than 25 $cm^3$. In a third embodiment, at least 90% of the pellets have a volume between 0.125 and 4 $cm^3$.

The pelletized binder can be packaged in bags for storage, or they can be transported to the job site for application of the HFST composition on a roadway, or dry mixing to form a road marking composition for application on a roadway.

In embodiments, the binder composition can be used directly in molten form in a surface treatment application. In an embodiment, the pelletized binder can be dry blended with the other components such as pigments and/or fillers before being used in molten form at the job site.

Aggregate for HFST: In embodiments, the binder composition is applied in conjunction with aggregate for a high friction surface. The aggregate is used to promote friction and skid-resistance for a coating, e.g., on a roadway, floor, etc. The surface contour of the aggregate provides the micro texture which affects skid-resistance. Aggregates are generally graded based on two parameters: polish resistance, normally reported in terms of polished stone value (PSV); and aggregate abrasion value (AAV) or LA Abrasion Value. The polished stone value is a measure of how resistant an aggregate is to polishing under traffic wear. The higher the PSV, the better the aggregate retains its surface texture (microtexture). Abrasion resistance is a measure of how resistant the aggregate is to material loss under traffic and can have a maximum LA Abrasion of 20% (AASHTO T96, (D grading)). Aggregates having a high aluminum oxide ($Al_2O_3$) content of 80 wt. % or more are preferred. The aggregates used for the HFST can have a size of at least 1 mm. In embodiments, aggregates have a nominal maximum size of from >10 mm, >7 mm, >5 mm, or 1-5 mm, or 1-4 mm, or 1-3 mm, or 3-4 mm. In embodiments, a minimum of 95 percent passing the No. 6 sieve and maximum of 5 percent passing the No. 16 sieve.

In an embodiment, the aggregate comprises calcined bauxite. In other embodiments, the aggregate comprises one or more materials selected from flint, granite, steel slag, or combinations thereof.

In other embodiments, the aggregate may comprise one or more minerals, rocks, metals, metal oxides, hydrates, salts, silicates, plastics, polymers, glasses, halides, sulfides, phosphates, carbonates, carbon oxides, ores, and/or the like.

In embodiments, the aggregate is pre-heated to a temperature greater than 100° C., or greater 150° C., or greater than 200° C., or greater than 220° C. before applied to the roadway coated with binder material.

The amount of aggregate can vary based on the nature of the aggregate and the nature of the surface to be treated. In an embodiment, up to 85% of aggregate can be present in the HFST system.

Optional Adhesion Agent Layer: In embodiments when the nature of the roadway surface is such that it adheres poorly to the binder composition, an adhesion agent is used. In such a situation, an adhesion agent is first applied on the roadway surface, followed by the HFST composition. The adhesion agent adheres strongly to the binder composition, and the combination is used to bind aggregate. In an embodiment, the adhesion agent is selected from terpene phenol resins, rosin ester based tackifiers, alpha methyl styrene resins, water-borne dispersions of the foregoing, epoxy based materials, acrylic emulsions, synthetic rubber emulsions, and modified styrene-butadiene copolymer emulsions.

In an embodiment, the adhesion agent is applied in an amount sufficient to cover a depth of up to a maximum of 1 mm, or <0.8 mm, or <0.6 mm, at an average rate of at least 0.3 lbs/sq-yd, >0.4 lbs/sq-yd, or >0.5 lbs/sq-yd, or >0.6 lbs/sq-yd or >0.7 lbs/sq-yd, or 0.3-1.0 lbs/sq-yd.

Applications of the HFST composition: When an HFST composition is applied on a roadway surface, friction between the road surface and a surface, example a tire surface, is improved. This can help improve roadway friction properties and reduce skidding, e.g., of a moving vehicle, especially on slick or wet surfaces, thereby improving road safety. The friction promoting action can also help in reducing the stopping distance of vehicles, such as heavy duty vehicles, e.g., 16-wheeler trucks.

Applications are not necessarily limited to roadway surfaces. The binder system can be used/applied where a high friction surface is needed, e.g., flooring, ship decks, staircases, pool decks, etc.

For roadway applications, the binder composition can be used in a system as illustrated in FIG. 1, for a motor driven vehicle with motors and pumps for heating/dispensing the binder composition onto the road. The vehicle comprises a tank for heating/holding the binder composition. The tank can be sized such that it can either be a reservoir holding a large amount of the molten material, or it could be a smaller tank where the pelletized binder are melted and fed into the dispensing system. The vehicle may be equipped with any of dispensing bars, spray nozzles, extruded rollers, orifices, pipe, tube, knives, ribboners and the like, for applying the binder materials onto the roadway.

The system also comprises a hopper for holding the aggregate and applying it on the binder layer. The hopper comprises a gate that is movable from a closed position to an option position to selectively dispense the aggregate on to the roadway at an aggregate delivery location. Additional hoppers can be installed to apply different sized aggregates to the binder layer. The hopper can be optionally heated.

Alternative Applications. It should be noted that the tackifier resin, elastomer, and binder compositions as disclosed herein can be used for other surface applications, such as road marking. In embodiments, a road marking composition comprises: a tackifier resin, an elastomer, optional plasticizer, optional fillers, optional wax, pigments, glass beads, and optional anti-skid media. The tackifier resin and elastomer can be combined into a binder material (e.g., as pellets) prior to being used in the road marking composition. In embodiments, the optional materials, e.g., plasticizers and/or waxes, can be combined with tackifier resin and elastomer for forming binder material (e.g., as pellets) prior to being used in road marking applications.

With respect to the glass beads, they are incorporated such that when the road marking composition degrades under UV, water, and traffic exposure, the glass beads will become exposed and serve as reflective elements for nighttime visibility while under illumination from vehicles' headlamps. In one embodiment, the marking material includes microcrystalline ceramic beads for high refractive index quality, for a durable optics system that returns more light to drivers than typical glass beads. Certain embodiments of the microcrystalline bead structure and elements include rare earth elements, with some materials having glow in the dark attributes that improve safety for drivers.

In embodiments, the amount of glass beads in a road marking composition as applied onto the pavement typically ranges up to 50 wt. %, or from 25 to 50 wt. %.

Anti-skid media can be incorporated in road marking applications when it is desirable for the composition to include friction and skid resistant properties, on a roadway, floor, etc. Examples include but are not limited to calcined bauxite, flint, granite, steel slag or combinations thereof, one or more minerals, rocks, metals, metal oxides, hydrates, salts, silicates, plastics, polymers, glasses, halides, sulfides, phosphates, carbonates, carbon oxides, ores, and/or the like In embodiments of road marking, the anti-skid media/agent is present in an amount up to 40%.

In embodiments of road marking applications, the tackifier resin as disclosed is present in an amount ranging from 5 to 60 wt. %, or 5 to 50 wt. %, or 10 to 50 wt. %, or 10 to 40 wt. % of the road marking composition as applied onto the pavement.

In embodiments of road marking, the elastomer as disclosed can be present in an amount ranging from 0.1 to 10 wt. %, 0.5 to 10 wt. %, or 1 to 10 wt. %, or 1 to 9 wt. %, or 2 to 8 wt. % of the road marking composition as applied onto the pavement.

In embodiments of road marking, the optional plasticizer as disclosed can be present in an amount ranging from 0.1 to 10 wt. %, 0.5 to 10 wt. %, or 1 to 10 wt. %, or 1 to 9 wt. %, or 2 to 8 wt. % of the road marking composition as applied onto the pavement.

In embodiments of road marking, the optional wax as disclosed can be present in an amount ranging from 1 to 10 wt. %, or 1 to 9 wt. %, or 2 to 8 wt. % of the road marking composition as applied onto the pavement.

Methods for Applying Road Marking Materials: At the application site, a road marking composition employing the binder material or pelletized binder material is melted using conventional equipment and applied directly onto the road surface. The molten road marking composition can be applied by any of spray, ribbon extrusion, spray extrusion, screed extrusion application techniques. The solid binder pellets save time and energy during a road marking process because they melt to homogenize more easily than typical dry blends of binder components. In one embodiment, the pelletized binder material contains all ingredients necessary to form the adhesive for a marking, to which additional components such as pigments, fillers, waxes, etc., or pellets containing a different thermoplastic binder, may be optionally added as determined by local conditions of application.

With the binder material being pelletized and of substantially homogenous composition, it melts easily and rapidly for blending into the marking composition in an amount of at least 5% wt. %, >10 wt. %, or ranging from 5-75 wt. %, or 5-60 wt. %, or 10-50 wt. % based on the total weight of the road marking composition. The amount to be added depends on whether components such as pigments, fillers, are already incorporated into the binder material, or other ingredients are added at the production location prior to shipping it to the application site. The melting temperature and the mixing time is dependent on the types and amounts of tackifier resins and elastomers employed in the binder material, e.g., ranging from 150° C. to 225° C., and in one embodiment, at a temperature of 200° C. or less. At location, the pellets together with the additional components can be fed directly from pellet hopper(s) to a mixing/melting tank, then an extruder optionally fitted with a heating chamber. After the marking material passes through the extruder, it emerges as a hot flat strip to be laid directly onto the surface to be marked as the vehicle travels along. In some embodiments, glass microbeads may be distributed over the still hot marking so that they adhere to the marking to provide retroreflective properties.

In some embodiments, the pelletized materials are use in "tankless" application operations. In a "tankless" process, no material would be heated in melt vessels or kettles. The pellets or particles would be added manually, pneumatically, or by other automatic or semi-automatic conveyance to a system of pipes and extruders capable of heating the material "on-demand" and without any preheating.

In embodiments, retroreflective particles, high-reflective index beads such as titanium-stabilized beads, etc., can be added in amounts required by local regulations or suitable for the application. The mass formed from pavement marking mixtures can be applied to a road surface as a hot spray. The mass formed from pavement marking mixtures can also be applied to a road surface by screed extrusion and ribbon extrusion methods. Immediately after application, retroreflective particles are scattered over the surface of the pavement markings to enhance the initial retroreflectance of the pavement markings. After being applied to the road surface, pavement marking mixtures can be set up quickly to form finished pavement markings that are retroreflective and resistant to weathering. Pavement markings formed may retain their retroreflective characteristics for relatively long periods because at least a portion of the retroreflective particles that form a part of the pelletized mixture is embedded below the surface of the pavement marking, and thus is more resistant to wear, the particles becoming exposed and functional as the marker wears away.

In embodiments, the binder materials in pre-formed shapes, e.g., pellets, strands, pastilles, etc., can be more conveniently handled at the production site compared to the handling of powdered mixtures and in a shorter amount of time, the disclosure herein provides a system and methods to customize binder materials.

A software can be pre-programmed to handle different recipes for a plurality of components, pre-blends, and blends customized for a particular application, adding additives to any of pellets comprising binder(s) and elastomer(s), pellets comprising binder(s) and plasticizer(s), pellets comprising various binders with plasticizer(s), pellets comprising mixtures of binder(s), elastomer(s) and plasticizer(s), pellets comprising alkyd resin and elastomer(s), pellets comprising hydrocarbon resin and elastomer(s), etc.

Method for Applying HFST System: Before starting the HFST, the roadway surface has to be adequately cleaned, e.g., shot-blasted, to remove dust and debris. If not done, or done improperly, the applied HFST layer can debond from the roadway surface, especially due to temperature changes.

The HFST composition is applied in a step-wise fashion. In one embodiment, a layer of the molten binder composition is applied to the roadway surface. The melting temperature and time needed to melt the pelletized binder is dependent on the types and amounts of resins and elastomers employed in the binder material. In embodiments, the melting temperature is up to 225° C., or up to 220° C., or from 150° C. to 225° C. The pelletized binder together with any additional components can also be fed directly from the pellet hopper(s) to a mixing/melting tank, from where the molten material is dispensed with the second dispensing bar. In embodiments, the step of melting can be achieved using an inline heater or a heated chamber located in the dispensing bar, then the second dispensing bar optionally fitted with a heating chamber. The temperature can be adjusted so that the molten binder can have the optimal viscosity to allow for smooth flow through the dispensing bar.

In embodiments, the binder composition can be applied on to the roadway to a thickness of 40-200 mils or, 40-175 mils, or 40-150 mils, or 40-125 mils, or 40-100 mils, or 40-75 mils, or 65-125 mils. The yield rate of the binder composition can be between 25-32 square feet per gallon, and depends on, among other factors, thickness of application, the texture of the roadway, etc. The method can be conveniently carried out by applying the HFST composition at the job site by loading the necessary components on a wheeled, motor-driven vehicle.

In some embodiments, the pelletized binder materials are used in "tankless" application operations. In a "tankless" process, no material would be heated in melt vessels or kettles. The pellets or particles would be added manually, pneumatically, or by other automatic or semi-automatic conveyance to a system of pipes and extruders capable of heating the material "on-demand" and without any preheating.

The binder composition is prepared by combining the needed components and heating to obtain a homogenous liquid with the required viscosity to be able to spray an even thickness layer on the pavement.

In the next step, an aggregate layer is applied on to the binder layer. The binder composition holds the aggregate in place on the roadway while also providing friction. The aggregate should be spread over the binder composition in less than 60 seconds, or 45 seconds, or 30 seconds, or 15 seconds, or 10 seconds, or 5 seconds, or 3 seconds after applying the binder composition to allow the aggregate to embed into the binder composition before the binder composition sets due to cooling. In embodiments, the aggregate layer is embedded to a depth of 30-70% in the binder layer, alternately 40-60% of the nominal aggregate size. The application rate of the aggregate can be between 10-20 lbs/sq-yd, or 10-25 lbs/sq-yd, or 12-15 lbs/sq-yd, or it can be more or less than this range. The aggregate can be applied to excess and then swept up and removed from the roadway surface. In embodiments, the aggregate can be applied to excess, and rolled using a pneumatic tire roller to embed the aggregate into the binder. The aggregate should completely cover the binder, leaving no "wet" spots.

The method for applying the HFST composition can include an optional step of applying an adhesion agent to promote adhesion, for example, on surfaces such as concrete and bridge decks. When this step is required, it can be carried out prior to applying the layer of the molten binder composition. The adhesion agent can, for example, be applied by a first dispensing bar of the HFST system.

Based on the type and nature of a roadway surface, and also the desired HFST treatment to be achieved, different recipes, made of the various components described above, can be prepared. These recipes/assays can be conveniently stored in a computer-driven database, which allows for easy retrieval. Further, the sequence of operations leading to the application of the HFST composition on the roadway surface can be driven by software using a computer. Thus, automated equipment that can mechanically meter, mix, monitor, and apply the various components can be used. Such an approach can avoid problems sometimes seen with manual application of the components, e.g., the binder composition.

The binder composition can be used in applications such as, HFST, roofing applications (e.g., roofing felts), adhesive applications, road marking and road construction including repair applications such as polymer-modified asphalt, or polymer modified asphalt emulsions.

EXAMPLES

Examples 1-15

In the examples, shown in Table 1, binder compositions are prepared by mixing the specified amounts of the various components followed by extrusion and then pelletization and/or dry blending. In examples 12-15, each binder mixture consists of a resin (e.g., a rosin ester) and an elastomer (e.g., SIS, SEBS, SEPS, MA grafted SEBS, etc.). In examples 5-12, each binder mixture further comprises a plasticizer, e.g., a process oil, or a commercially available rejuvenator oil. In examples 1-4, fillers or fillers and pigments are also included. This binder composition can be subsequently used as road marking or as a HFST.

Examples 16-23

A description of the elastomer and tackifier resin components are as follows. This binder composition can be subsequently used as road marking or as a HFST.

Elastomer 1 is a linear triblock copolymer based on styrene and isoprene with a diblock content of 19%, a polystyrene content of 15 wt. %, and a styrene/rubber weight ratio of 15/85.

Elastomer 2 is a linear triblock copolymer based on styrene and isoprene with a polystyrene content of 43%, a styrene/rubber weight ratio of 44/56, and a diblock content of <1%.

Elastomer 3 is a linear triblock copolymer based on styrene and isoprene, with a polystyrene content of 15%, a styrene/rubber weight ratio of 15/85, and a diblock content of 38%.

Elastomer 4 is a linear triblock copolymer based on styrene and ethylene/butylene with a polystyrene content of 57%, a styrene/rubber weight ratio of 58/42, and a diblock content of <1.

Elastomer 5 is a linear triblock copolymer based on styrene and isoprene with a polystyrene content of 19%, a styrene/rubber weight ratio of 19/81, and a diblock content of <1%.

Elastomer 6 is a radial triblock copolymer based on styrene and isoprene, with a polystyrene content of 30%, a styrene/rubber weight ratio of 30/70, and a diblock content of 30%.

Resin 1 is a modified rosin ester with a softening point of 107° C., a glass transition temperature of 63° C., a flash point>250° C., a Gardner color of 4, and an acid value of 38.

Resin 2 is a modified rosin ester with a softening point of 98° C., a glass transition temperature of 48° C., Gardner color of 4, and an acid value of 10.

In the examples 16-23 (Table 2), the road marking composition is formed by heating the components to 200° C. or 392° F. for a 1-2 hour period to obtain a homogenous mixture.

Examples 24-31

The pre-blend pellets of examples 1-7 in Table 3, are used to form pavement marking mixtures for examples 24-31 in the continued Table 2 (i.e., example 1 pellets are used to form marking composition in example 24, example 2 pellets are used in example 25, etc.). In all examples, the mixture of pellets and additional components are heated to at least 180° C. to obtain a homogenous composition, before application to a surface.

The road marking phase stability (homogeneity) was determined for Examples 1-8 as shown in Table 2. The road marking composition was prepared by weighing all raw materials into a 1-liter metal tin and start stirring. After charging, the metal tin is placed into a beaker heater in a fume cupboard for heating up to 180-200° C. Besides the agitator, use a knife to hand stir as well. When the solid materials turn to paste, hand stirring is not needed. Use a laser thermometer to measure the temperature. After it reaches temperature of 190° keep it stirring for 30 minutes before discharging into a 100 ml tube, with a 2 cm diameter and a length of 10 cm. The binder composition was aged at 200° C. for 6 hours, then solidified. After solidification, a 1 cm sample is sliced from the top and bottom which is analyzed by GPC using polystyrene standards to obtain the percentage of elastomer difference.

The phase separation ratio is calculated by taking the amount of elastomer in the top sample and dividing by the percentage of elastomer in the bottom sample.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, all technical and scientific terms used herein have the same meanings as commonly understood by one of skill in the art to which the disclosed disclosure belongs. the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

TABLE 1

| Example | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Resin | 20.0 | 18.6 | 28.0 | 45.8 | 41.7 | 53.8 | 88.9 | 77.8 | 66.7 | 84.6 | 92.3 | 69.2 | 93.3 | 87.5 | 62.5 |
| Elastomer | 2.9 | 2.1 | 4.0 | 4.2 | 8.3 | 7.7 | 5.6 | 11.1 | 27.8 | 7.7 | 3.8 | 23.1 | 6.7 | 12.5 | 37.5 |
| Wax | — | 2.1 | 0.0 | — | — | — | — | — | — | — | — | — | — | — | — |
| Plasticizer | 2.9 | 2.9 | 4.0 | 4.2 | 4.2 | 7.7 | 5.6 | 11.1 | 5.6 | 7.7 | 3.8 | 7.7 | 0.0 | 0.0 | 0.0 |
| Pigment | 14.3 | 14.3 | 8.0 | 4.2 | 0.0 | 0.0 | 0.0 | 0.0 | 0.0 | 0.0 | 0.0 | 0.0 | 0.0 | 0.0 | 0.0 |
| Filler | 60.0 | 60.0 | 56.0 | 41.7 | 45.8 | 30.8 | 0.0 | 0.0 | 0.0 | 0.0 | 0.0 | 0.0 | 0.0 | 0.0 | 0.0 |
| Total Pellet | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |

TABLE 2

| Example (wt %) | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| EVA | 8.0 | — | — | — | — | | | | 1.0 | — | | — | — | | | |
| Elastomer 1 | — | 8.0 | 8.0 | — | — | | | | — | 1.0 | 1.0 | — | — | | | |
| Elastomer 2 | — | — | — | 8.0 | — | | | | — | — | — | 1.0 | — | | | |
| Elastomer 3 | — | — | — | — | 8.0 | | | | — | — | — | — | 1.0 | | | |
| Elastomer 4 | | | | | | 8.0 | | | | | | | | 1.0 | | |
| Elastomer 5 | | | | | | | 8.0 | | | | | | | | 1.0 | |
| Elastomer 6 | | | | | | | | 8.0 | | | | | | | | 1.0 |
| Resin 1 | 47 | 47 | 30 | 47 | 47 | 47 | 47 | 47 | 16 | 16 | 10 | 16 | 16 | 16 | 16 | 16 |
| Resin 2 | | | 17 | | | | | | | | 6 | | | | | |
| Wax | | | | | | | | | | | | | | | | |
| Plasticizer | — | — | — | — | — | | | | 2 | 2 | 2 | 2 | 2 | 2 | 2 | 2 |
| Pigment (TiO$_2$) | 10 | 10 | 10 | 10 | 10 | 10 | 10 | 10 | 10 | 10 | 10 | 10 | 10 | 10 | 10 | 10 |
| Filler | — | — | — | — | — | — | — | — | 36 | 36 | 36 | 36 | 36 | 36 | 36 | 36 |
| Glass Beads | 35 | 35 | 35 | 35 | 35 | 35 | 35 | 35 | 35 | 35 | 35 | 35 | 35 | 35 | 35 | 35 |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| Results | | | | | | | | | | | | | | | | |
| Phase separation | N | Y | N | N | Y | N | Y | Y | N | Y | N | N | Y | N | Y | Y |
| % elastomer road marking formulation | 8 | 8 | — | 8 | 8 | 8 | 8 | 8 | — | — | — | — | — | — | — | — |
| % elastomer in binder phase- initial | 15 | 15 | — | 15 | 15 | 15 | 15 | 15 | — | — | — | — | — | — | — | — |
| % elastomer in binder after aging in melt (top of sample) | 15 | 31.7 | — | 16.3 | 30.6 | 15 | 30.7 | 18.0 | — | — | — | — | — | — | — | — |
| % elastomer in binder after aging in melt (bottom of sample) | 15 | 3.2 | — | 15.2 | 1.2 | 15 | 0.8 | 3.7 | — | — | — | — | — | — | — | — |
| Top/Bottom elastomer in binder Ratio | 1 | 9.9 | — | 1.1 | 25.5 | 1 | 38.4 | 4.9 | — | — | — | — | — | — | — | — |

TABLE 3

| | Pelletized Binder Material | | | | | | |
|---|---|---|---|---|---|---|---|
| Example | 1 | 2 | 3 | 4 | 5 | 6 | 7 |
| Resin 1 | 85 | 85 | 85 | 85 | 85 | 85 | 85 |
| EVA | 15 | — | — | — | — | — | — |
| Elastomer 1 | — | 15 | — | — | — | — | — |
| Elastomer 2 | — | — | 15 | — | — | — | — |
| Elastomer 3 | — | — | — | 15 | — | — | — |
| Elastomer 5 | — | — | — | — | 15 | — | — |
| Elastomer 6 | — | — | — | — | — | 15 | — |
| Elastomer 4 | — | — | — | — | — | — | 15 |
| Total Pellet | 100.0 | 100.0 | 100.0 | 100.0 | 100.0 | 100.0 | 100.0 |
| Phase separation | N | Y | N | Y | Y | Y | N |

Paragraph 1. A composition for applying onto a road surface comprising: an elastomer in an amount of 0.1 to 10 wt. %, selected from one or more of the following: styrene-isoprene-styrene rubber (SIS) or styrene-ethylene/butylene/styrene-styrene (SEBSS) having a general formula configuration of A-B-A, (A-B)nX, (A-B-A)nX, (A1-B)dX-e(B-A2), where X is the residue of a coupling agent and n is from 2 to 30, d is 1 to 30, and e is 1 to 30; wherein each block A block is selected from an unhydrogenated, partially hydrogenated or fully hydrogenated mono alkenyl arene polymer block having a peak number average weight between about 3,000 and about 60,000; wherein each B block is selected from a partially hydrogenated or fully hydrogenated copolymer block of at least one conjugated diene monomer and at least one mono alkenyl arene having a peak number average molecular weight between 20,000 to 300,000; wherein the SIS has a mono alkenyl arene content of greater than 30 wt. %; wherein the elastomer has a particle size of greater than 2500 μm; where the elastomer is characterized as having a phase separation ratio of 0.4 to 2 in a Phase Separation Test; a tackifier resin selected from hydrocarbon resins, rosin resins, rosin esters, alkyd resins, and combinations thereof in an amount of 5 to 60 wt. %; pigments in amount of 0-15 wt. %; and at least a component selected from: glass beads in an amount of up to 50 wt. %; anti-skid media in an amount of up to 85% wt. %; fillers in an amount of up to 25-50 wt. %; waxes in an amount of up to 10 wt. %; elastomer/plastomer component in an amount of up to 10 wt. %; plasticizers in an amount of up to 10 wt. %.

Paragraph 2. The composition for applying onto a road surface of claim 1, wherein the elastomer and tackifier resin are pelletized, forming a pelletized binder material.

Paragraph 3. The composition for applying onto a road surface of claim 2, wherein the pelletized binder material is present in an amount of 5-75% based on the total weight of the composition.

Paragraph 4. The composition for applying onto a road surface of claim 2, wherein at least a component selected from are pigments, glass beads, anti-skid media, fillers, waxes, elastomer/plastomer, and plasticizers are pelletized.

Paragraph 5. The composition for applying onto a road surface of claim 1, wherein the composition is used for high friction surface treatments, wherein the composition comprises at least 70 wt % of anti-skid media.

Paragraph 6. The composition for applying onto a road surface of claim 1, the tackifier resin comprises rosin ester resins selected from hydrogenated hydrocarbon rosin esters, acrylic rosin esters, disproportionation rosin esters, dibasic acid modified rosin esters, polymerized resin esters, phenolic modified rosin ester resins, and mixtures thereof.

Paragraph 7. The composition for applying onto a road surface of claim 5, wherein the rosin ester has a softening point of 80° C. and 150° C.

Paragraph 8. The composition for applying onto a road surface of claim 1, wherein the alkyd resin is selected from maleated rosin, fumarated rosin, acrylated rosin, amidated rosin, nitrated rosin, chlorinated rosin, brominated rosin, and mixtures thereof.

Paragraph 9. The composition for applying onto a road surface of claim 1, wherein the hydrocarbon resin is selected from the group of C5 aliphatic hydrocarbon resins, C9 aromatic hydrocarbon resins, C5/C9 hydrocarbon blend, and saturated resins made from hydrogenation of these hydrocarbon resin Paragraph 10. The composition for applying onto a road surface of claim 1, wherein the block copolymer comprises at least one C block, wherein the is a polymer block of one or more conjugated dienes having a number average molecular weight between about 2,000 and about 200,000.

Paragraph 11. The composition for applying onto a road surface of claim 1, wherein the elastomer is a styrene-isoprene-styrene (SIS) block copolymer composition having a polystyrene block molecular weight greater than 10,000.

Paragraph 12. The composition for applying onto a road surface of claim 1, wherein the B block is at least one conjugated diene and at least one mono alkenyl arene and having a random distribution, a block distribution, a tapered distribution, or a controlled distribution.

Paragraph 13. The composition for applying onto a road surface of claim 1, wherein the elastomer has a vinyl aromatic content of 30 wt. % to about 80 wt. %.

Paragraph 14. The composition for applying onto a road surface of claim 1, wherein the elastomer/plastomer is selected from the group of natural rubber (NR), isoprene rubber (IR), styrene-butadiene rubber (SBR), chloroprene rubber (CR), butadiene rubber (BR), nitrile butadiene rubber (NBR), isobutylene-isoprene rubber (IIR), ethylene-propylene diene monomer (EPDM), urethane rubber (UR), silicone rubber (SR), fluorocarbon rubber (FR), ethyl vinyl acetate (EVA), graft copolymers of EVA with another monomer, hot melt polyamide resin, and mixtures thereof.

Paragraph 15. The composition for applying onto a road surface of claim 1, wherein the plasticizer is selected from the group of vegetable oils, process oils, mineral oils, phthalates and mixtures thereof.

Paragraph 16. The composition for applying onto a road surface of claim 1, wherein the wax is selected from vegetable waxes, petroleum derived waxes, and synthetic waxes.

Paragraph 17. A method for forming a composition for applying onto a road surface comprising: providing pellets of a composition comprising at least an elastomer in an amount of 0.1 to 10 wt. %, selected from: styrene-isoprene-styrene rubber (SIS) or styrene-ethylene/butylene/styrene-styrene (SEBSS) having a general formula configuration of A-B-A, (A-B)nX, (A-B-A)nX, (A1-B)dX-e(B-A2), where X is the residue of a coupling agent and n is from 2 to 30, d is 1 to 30, and e is 1 to 30; wherein each block A block is selected from an unhydrogenated, partially hydrogenated or fully hydrogenated mono alkenyl arene polymer block having a peak number average weight between about 3,000 and about 60,000; wherein each B block is selected from a partially hydrogenated or fully hydrogenated copolymer block of at least one conjugated diene monomer and at least one mono alkenyl arene having a peak number average molecular weight between 20,000 to 300,000; wherein the SIS has a mono alkenyl arene content of greater than 30 wt. %; wherein the elastomer has a particle size of greater than 2500 μm; where the elastomer is characterized as having a phase separation ratio of 0.4 to 2 in a Phase Separation Test; and a tackifier resin selected from hydrocarbon resins, rosin resins, rosin esters, alkyd resins, and combinations thereof in an amount of 20 to 96 wt. %; 0.1 to 10 wt. %; and mixing the pellets with optional components selected from glass beads, anti-skid media, fillers, waxes, elastomers/plastomers, plasticizers and combinations thereof to form the composition for applying onto a road surface.

Paragraph 18. The method of forming a road marking composition of claim 18, further comprising applying the road marking composition to a road surface by extrusion or a hot spray.

Paragraph 19. The method of forming a road marking composition of claim 18, wherein the pellets are present in an amount of 5-75% based on the total weight of the composition.

Paragraph 20. The composition for applying onto a road surface of claim 1, wherein the elastomer comprises at least one C block, wherein the is a polymer block of one or more conjugated dienes having a number average molecular weight between about 2,000 and about 200,000.

The invention claimed is:

1. A method for treating a roadway with a high friction surface, the method comprising the steps of:
    providing a binder composition, comprising:
        10-99.9 wt. % of a resin, wherein the resin is selected from hydrocarbon resins, alkyd resins, rosin resins, rosin esters, and combinations thereof;
        0.1-70 wt. % of an elastomer;
    heating the binder composition to a sufficient temperature to obtain a molten binder composition;
    applying a layer of the molten binder composition on the roadway for a thickness of at least 40 mils; and
    applying a layer comprising aggregates on top of the molten binder composition, wherein the aggregates have a nominal maximum size of at least 1 mm,
    wherein the layer comprising aggregates is applied on top of the molten binder composition layer within 60 seconds, for the aggregates to be embedded to a depth of at least 30% in the molten binder composition layer.

2. The method of claim 1, wherein the binder composition further comprises one or more of: a plasticizer, a pigment, a wax, and a filler.

3. The method of claim 2, wherein the plasticizer is selected from vegetable oils, mineral oils, process oils, phthalates and mixtures thereof in an amount of up to 15 wt.

4. The method of claim 1, further comprising applying a layer of adhesion agent on to the roadway surface prior to applying the layer of molten binder composition.

5. The method of claim 4, wherein the adhesion agent is selected from terpene phenol resins, rosin ester based tackifiers, alpha methyl styrene resins, water-borne dispersions thereof, epoxy based materials, acrylic emulsions, synthetic rubber emulsions, and modified styrene-butadiene copolymer emulsions.

6. The method of claim 1, wherein the alkyd resin is selected from a rosin resin, a rosin ester, derivatives of rosin resin and rosin esters, and combinations thereof, wherein the rosin resin is selected from a modified rosin resin, a rosin ester, and combinations thereof.

7. The method of claim 6, wherein the modified rosin resin is selected from maleated rosin, fumarated rosin, acrylated rosin, amidated rosin, nitrated rosin, chlorinated rosin, brominated rosin, and mixtures thereof.

8. The method of claim 1, wherein the hydrocarbon resin selected from a C5 aliphatic hydrocarbon resin, a C9 aromatic hydrocarbon resin, a hydrogenated C5/C9 hydrocarbon blend, and combinations thereof.

9. The method of claim 1, wherein the rosin ester comprises the reaction product of one or more rosin acids and one or more alcohols selected from the group consisting of methanol, triethylene glycol, glycerol, and pentaerythritol.

10. The method of claim 1, wherein the elastomer is selected from the group of: natural rubber (NR), isoprene rubber (IR), styrene-butadiene rubber (SBR), chloroprene rubber (CR), butadiene rubber (BR), nitrile butadiene rubber (NBR), isobutylene-isoprene rubber (IIR), ethylene-propylene diene monomer (EPDM), urethane rubber (UR), silicone rubber (SR), fluorocarbon rubber (FR), styrene-isoprene-styrene rubber (SIS), styrene-butadiene-styrene rubber (SBS), styrene-ethylene/butylene-styrene (SEBS), styrene-ethylene/butylene/styrene-styrene (SEBSS), styrene-ethylene/propylene-styrene (SEPS), ethyl vinyl acetate (EVA), graft copolymers of EVA with another monomer such as vinyl chloride, a hot-melt polyamide resin, and mixtures thereof.

11. The method of claim 1, wherein the elastomer is selected from styrene-isoprene-styrene rubber (SIS), styrene-butadiene-styrene rubber (SBS), styrene-ethylene/butylene-styrene (SEBS), and SEBS rubber having 1 to 3 wt. % maleic anhydride (MA) grafted onto the rubber midblock.

12. The method of claim 1, wherein the elastomer is selected from one or more of the following:
    styrene-isoprene-styrene rubber (SIS) or styrene-ethylene/butylene/styrene-styrene (SEBSS) having a general formula configuration of A-B-A, (A-B)$_n$X, (A-B-A)$_n$X, (A$_1$-B)$_d$X-$_e$(B-A$_2$), where X is the residue of a coupling agent and n is from 2 to 30, d is 1 to 30, and e is 1 to 30;
    wherein each block A block is selected from an unhydrogenated, partially hydrogenated or fully hydrogenated mono alkenyl arene polymer block having a peak number average weight between about 3,000 and about 60,000;
    wherein each B block is selected from a partially hydrogenated or fully hydrogenated copolymer block of at least one conjugated diene monomer and at least one mono alkenyl arene having a peak number average molecular weight between 20,000 to 300,000;
    wherein the SIS has a mono alkenyl arene content of greater than 30 wt.

13. The method of claim 12, wherein the elastomer comprises at least one C block, wherein the is a polymer block of one or more conjugated dienes having a number average molecular weight between about 2,000 and about 200,000.

14. The method of claim 1, wherein the resin, the elastomer, and one or more of a plasticizer, a pigment, a wax, and a filler are combined together as pellets of a homogeneous composition prior to being combined with other components forming the binder composition of the high friction surface.

15. The method of claim 1, wherein the binder composition is provided as pellets.

16. The method of claim 1, wherein the aggregate is selected from calcined bauxite, flint, granite, and steel slag.

17. The method of claim 1, wherein the binder composition is heated up to a temperature of less than 225° C. to obtain the molten binder composition.

18. The method of claim 1, wherein the molten binder is applied to the roadway to a thickness of 40-75 mils.

19. A composition for spreading on a roadway, according to the method of claim 1, wherein the composition comprises:
    10-96 wt. % of a resin, wherein the resin is selected from hydrocarbon resins, alkyd resins, rosin resins, rosin esters, and combinations thereof;
    0.1-30 wt. % of an elastomer;
    aggregates, wherein the aggregates have a nominal maximum size of at least 1 mm; and
    at least a component selected from:
        up to 15 wt. % plasticizer
        up to 10 wt. % pigment
        up to 15 wt. % wax
        up to 60 wt. % filler.

20. The composition of claim 19, wherein the elastomer is selected from the group of: natural rubber (NR), isoprene rubber (IR), styrene-butadiene rubber (SBR), chloroprene rubber (CR), butadiene rubber (BR), nitrile butadiene rubber (NBR), isobutylene-isoprene rubber (IIR), ethylene-propylene diene monomer (EPDM), urethane rubber (UR), silicone rubber (SR), fluorocarbon rubber (FR), styrene-isoprene-styrene rubber (SIS), styrene-butadiene-styrene rubber (SBS), styrene-ethylene/butylene-styrene (SEBS), styrene-ethylene/butylene/styrene-styrene (SEBSS), styrene-ethylene/propylene-styrene (SEPS), ethyl vinyl acetate (EVA), graft copolymers of EVA with another monomer such as vinyl chloride, a hot-melt polyamide resin, and mixtures thereof.

* * * * *